(12) United States Patent
Semret et al.

(10) Patent No.: US 7,177,832 B1
(45) Date of Patent: Feb. 13, 2007

(54) SYSTEM AND METHOD FOR PERFORMING A PROGRESSIVE SECOND PRICE AUCTION TECHNIQUE

(75) Inventors: Nemo Semret, New York, NY (US); Aurel A. Lazar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/674,024

(22) PCT Filed: Mar. 23, 1999

(86) PCT No.: PCT/US99/06384

§ 371 (c)(1),
(2), (4) Date: May 14, 2001

(87) PCT Pub. No.: WO00/57323

PCT Pub. Date: Sep. 28, 2000

(51) Int. Cl.
G06Q 40/00 (2006.01)
G06Q 99/00 (2006.01)

(52) U.S. Cl. .............. 705/37; 705/1; 705/35

(58) Field of Classification Search .......... 705/37, 705/26, 80, 35, 1, 8; 710/241; 370/351
See application file for complete search history.

(56) References Cited

U.S. PATENT DOCUMENTS

| | | | | |
|---|---|---|---|---|
| 5,077,665 A | * | 12/1991 | Silverman et al. | 705/37 |
| 5,136,501 A | * | 8/1992 | Silverman et al. | 705/37 |
| 5,487,168 A | | 1/1996 | Geiner et al. | |
| 5,610,910 A | * | 3/1997 | Focsaneanu et al. | 370/351 |
| 5,640,569 A | * | 6/1997 | Miller et al. | 710/241 |
| 5,794,212 A | * | 8/1998 | Mistr, Jr. | 705/26 |
| 5,802,502 A | | 9/1998 | Gell et al. | |
| 5,835,896 A | * | 11/1998 | Fisher et al. | 705/37 |
| 5,842,178 A | * | 11/1998 | Giovannoli | 705/26 |
| 5,890,138 A | * | 3/1999 | Godin et al. | 705/26 |

(Continued)

FOREIGN PATENT DOCUMENTS

EP 0 122 040 A1 * 10/1984

OTHER PUBLICATIONS

Orda, Ariel; Pacifici, Giovanni; and Pendarakis, Dimitrios E. Technion; "Adaptive virtual path allocation ploicy for broadband networks"; IEEE; V 1; p. 329.*

(Continued)

*Primary Examiner*—Ella Colbert
(74) *Attorney, Agent, or Firm*—Baker Botts L.L.P.

(57) ABSTRACT

A system and method for allocating a resource using a progressive second price auction technique. An auction is held for a limited resource, such as bandwidth in an Internet Service Provider Network in which bids are submitted by prospective users including the quantity desired and the price for each unit of resource bid upon. In order to make an efficient allocation, a new bidder is granted some of the resource based upon the availability of the limited resource due to the bids higher than the new bidder. The actual price paid by the new bidder is based upon bids made with lower prices who have been or would have been allocated some of the resource. This calculation of the price paid encourages bidders to bid their actual valuation of the resources rather than engage in inefficient tactical bids.

36 Claims, 10 Drawing Sheets

U.S. PATENT DOCUMENTS

| | | | | |
|---|---|---|---|---|
| 5,905,974 | A | * | 5/1999 | Fraser et al. .................. 705/37 |
| 5,905,975 | A | * | 5/1999 | Ausubel ...................... 705/37 |
| 5,924,082 | A | * | 7/1999 | Silverman et al. ............ 705/37 |
| 5,950,176 | A | * | 9/1999 | Keiser et al. ................. 705/37 |
| 5,956,716 | A | * | 9/1999 | Kenner et al. ................ 707/10 |
| 5,991,292 | A | * | 11/1999 | Focsaneanu et al. ........ 370/352 |
| 5,995,947 | A | * | 11/1999 | Fraser et al. .................. 705/38 |
| 6,006,201 | A | * | 12/1999 | Berent et al. ................. 705/27 |
| 6,009,154 | A | * | 12/1999 | Rieken et al. ......... 379/114.12 |
| 6,055,504 | A | * | 4/2000 | Chou et al. .................... 705/1 |

OTHER PUBLICATIONS

Feldman, R.A., Mehra, R. Auction: Theory and Applications. International Monetary Fund staff papers. Sep. 1993, vol. 40, No. 3, pp. 485-511.

Anonymous, New Zealand Moves Toward Market Driven Spectrum Allocation. Spectrum Report, Feb. 1, 1991, vol. 1, No. 4, p. 1.

Anonymous, Revenge of the Nerds: When government auctioneers need worldly advice, where can they trun? To mathmatical economics, of course. Economist, Jul. 23, 1994, vol. 332, No. 7873, p. 70.

* cited by examiner

SYSTEM AND METHOD FOR PERFORMING A PROGRESSIVE SECOND PRICE AUCTION TECHNIQUE

FIELD OF THE INVENTION

This invention relates to a system and method for performing a progressive second price auction technique in order to effectively allocate a finite resource among competing requestors.

BACKGROUND OF INVENTION

A significant problem is created when a finite divisible resource is desired by two or more entities and more of the resource is requested than can possibly be allocated and distributed to the requesting entities. When the demand for a resource or product exceeds the supply, market auctions can be created in order to properly allocate the limited resource or product to the requesting entities. For example, a finite commodity such as oil is only produced in limited quantities per month and the oil is auctioned and sold in international markets. If only one million barrels of oil is produced in a month, bidders can submit bids through the international market and typically the highest bidder will win its requested allocation of the oil and will pay the supplier of the oil the price which was bid.

The problem of allocating finite resources also occurs in the electronic world. The Internet allows parties to communicate and exchange data over vast distances. However, the rate of information flow can be affected by the number of users utilizing an Internet Service Provider ("ISP") and users are forced to endure long pauses in their network connections. If critical data needs to be transmitted and received almost instantaneously over a network, premium bandwidth of an ISP can be reserved for that user. While premium bandwidth can be provided by an ISP, the bandwidth is a limited resource and many users will desire all or part of the available premium bandwidth. A standard auction of the bandwidth would consist of the premium bandwidth being allocated to the highest bidder for which the bidder pays the price of the bid. However, this type of auction produces inefficiencies for larger numbers of bidders and where the bids made and availability of the premium bandwidth change over time. Other allocation mechanisms require exchanging large messages to convey demand information and are inappropriate for communication networks due to the heavy signaling load they would impose. An improved auction and allocation technique is needed.

In order to achieve an improved allocation technique, some economic principles can be applied to the technique. The example of allocating the resource of premium bandwidth will be used in the following discussion. A communication network's value such as the Internet can be characterized by what economists call externalities. The principles of externalities are that the value a user gets from the network depends upon the valuation and behavior of the other users. One recognized principle is that a communication network is more valuable to a user if more people are connected to the network. A second recognized principle is that as the utilization of the network by one user increases, the quality of service obtained by the other users decreases. Resources are shared by users who because of distance, population size, or individual selfishness cannot or will not coordinate their actions sufficiently to achieve the most desirable allocation of resources. This externality principles model indicates that a game theoretic approach in which other bidders actions are determinative of allocations and costs to a bidder could be used to improve the allocation of resources on a communication network.

The allocation of limited resources in connection with a communications network can be performed in both an actual market embodiment, when users are bidding real dollars or other items of value, and a private system embodiment, where the bids are to performed with internal budget allocations in order to obtain limited resources of the processing entity. For example, different university departments could bid on time used on a special university component with university dollars supplied by the university.

In the emerging multiservice networks (ATM, Next-Generation Internet), neither flat pricing by the peak capacity of the user's connection as used in the current Internet nor time-of-day usage prices as used in the telephone system are viable solutions to gain an efficient allocation of resources. Thus there is a need to develop a new approach to pricing of network resources. The requirements of an efficient pricing system include: (1) sensitivity to the range of resource requirements (either through a sufficiently broad range of traffic classes which are priced differently or by allowing users to explicitly quantify resource requirements); (2) prices must be dynamically responsive to unpredictable demand (market based system); and (3) the pricing architecture should constrain as little as possible the efficiency trade-offs. It would be desirable to achieve an auction technique which meets the above requirements and provides a more efficient allocation of a finite resource.

SUMMARY OF THE INVENTION

The present invention is directed to a system and method for allocating a divisible resource using a progressive second price action technique. The technique retrieves data indicative of at least one previous bid comprising a quantity data component and a price data component, retrieves said data indicative of a new bid comprising a quantity component and a price component, allocates the resource to the first bids with price components higher than the new bid, allocates the resource to the new bid if there is some portion of the resource which has not yet been allocated and calculates the new bid's cost based upon the price component of the other bids which have been or would have been allocated the resource but for the new bid.

By calculating the cost of the resource based upon the principles of the progressive second price auction technique, which calculate the cost to the bidder response to other bidders, each bidder is encouraged to bid its true valuation for the resource and is discouraged from using inefficient bidding strategies. The use of the present technique leads to a more efficient allocation system. Additional new bidders can be processed and allocated resource and the cost of the allocation to the bidder will be based upon the other bids.

An example of a resource which can be allocated is premium bandwidth by an Internet Service Provider (ISP). The ISP can process bids from different clients requesting premium bandwidth using the second price auction technique. In one embodiment, the ISP performs an initial allocation based upon initials bids and processes each new bid after the initial allocation is done. In a second embodiment, no such initial allocation is required. The bids in an auction are sorted by price component, allocated resource for bids with price components above the new bid and then allocated resource for the new bid. The cost of the new bid is based upon the bids of lower bidders who would have been allocated some bandwidth if the new bid had not been made. Thus the cost to the bidder is based upon others bids. The cost charged to the new bid equals the sum of the quantity allocations reduced on other players weighted by the bid price of such players. This technique of calculated payments or other bids encourages people to bid their actual value for the resource because the cost paid by the winning bidder is based upon other bidders' bids.

The ISP can also make its own floor bid in order to make sure that bids awarded allocations will pay a certain cost level.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
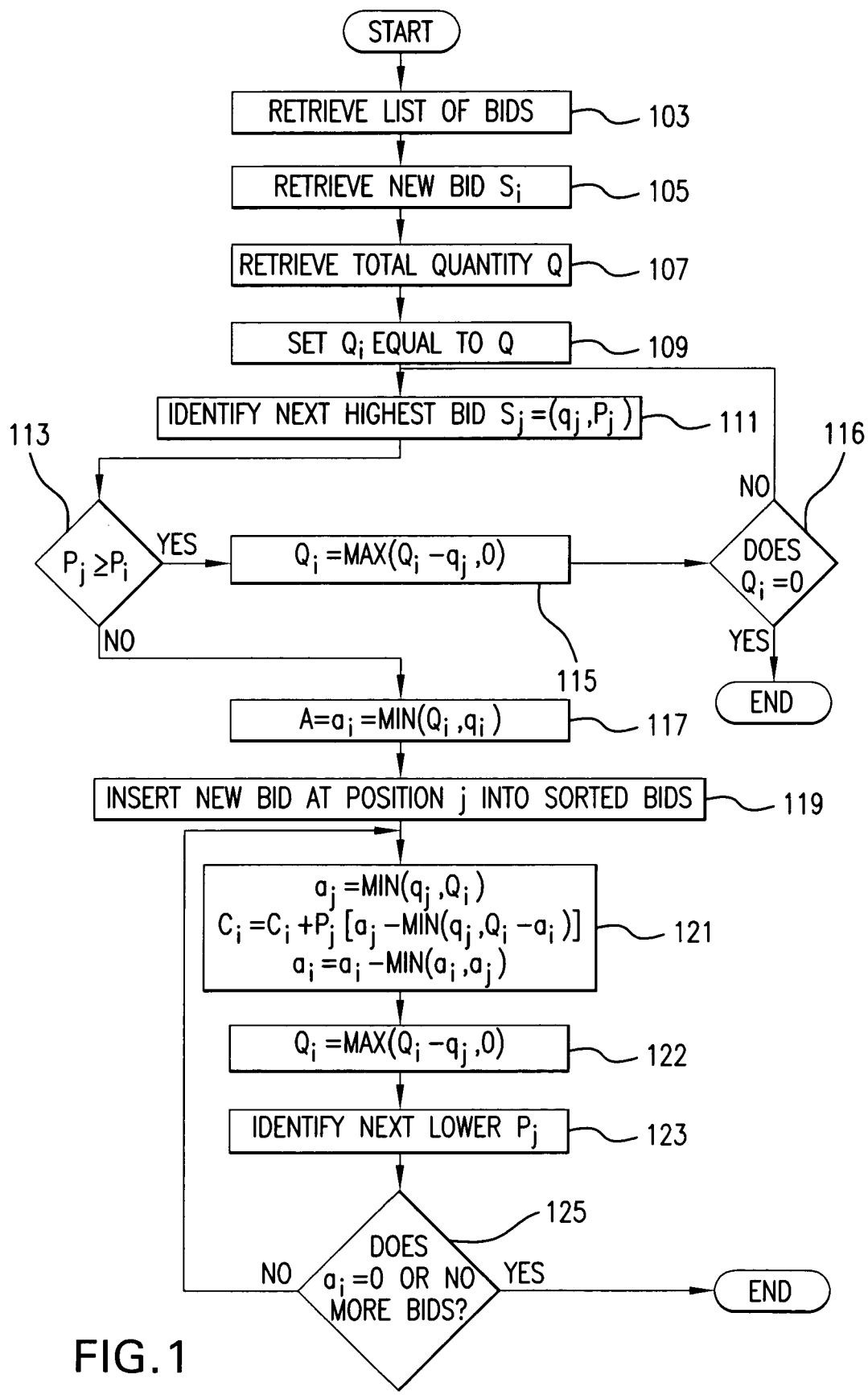
FIG. 1 is a flow chart of the steps describing the progressive second price auction technique.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

The inventive technique uses a progressive second price auction mechanism. A second price auction works as follows: if an object is being auctioned between the parties, the highest bidder will be awarded the object, however, the price the winning bidder pays is the second highest price bid. This type of bidding encourages bidders to bid their true valuation of the object making the auction efficient rather than attempting to engage in inefficient bidding tactics such as one dollar more than the expected highest bid. Since the highest bidder will be paying the cost of the second highest bid, there is no incentive to bid below the actual valuation of the object being bid upon. If all the other bidders are well below the bidder's bid, he will only pay the next highest bid. If the bidder bids above his valuation of the object, he may pay more than his valuation depending upon the other bidders which is not desirable. Thus there is no incentive to bid higher than valuation.

The progressive second price auction technique applications is extended from that of the single object example to cover bidding on divisible resources over time. The technique creates a very efficient mechanism to auction and allocate a finite resource among multiple bidders. With many bidders in an auction, most players will receive a part of the resource commensurate with their valuation of the resource being auctioned.

FIG. 1 is a flow chart of the steps for performing the progressive second price auction technique. While the technique described in FIG. 1 can be used to auction any resource or other divisible good or service, the description will be of an auction of units of a generic resource. An application to an actual resources which can be allocated could be premium bandwidth for example. In FIG. 1 and throughout this application, a bid is defined as having two components: a quantity component and a price component. For example, a bidder in an auction for a resource may submit a bid for five units (quantity) at a price of $2 per unit. While only quantity and price components of a bid are described in the preferred embodiment, additional components or other information could also be included in the bid as needed.

Step 103 retrieves a list of bids previously made for the resource in a particular auction which have been previously sorted by decreasing bid price. This means the bid with the highest price offered will be first in the list and so on. Alternatively, the bids can be sorted after they are retrieved. The list of bids can be stored in a computer file, in memory of the processor performing the auction, be inputted by the keyboard or transmitted over a network in real-time by the bidder's software bidding agent at the time of the auction or can be retrieved by any other means when the progressive second price auction technique is performed. For example, if ten bidders have previously bid for premium bandwidth in an auction, these bids (including the quantity desired and price per unit offered) will be stored in the memory of a computer or other apparatus operating the technique. The bids will then be sorted by a conventional sorting technique to place the previous bids in order from highest and lowest. Alternatively, the bids can be stored in decreasing price order in a linked list as they are received. If the bid to be processed is the first bid made in the auction and no other bid have been stored, the bid will become the first bid in the list.

Step 105 retrieves the new bid ($S_i$) to be processed which has at least both a quantity component ($q_i$) and price component ($p_i$). The quantity component is in predefined units for the auction, for example, one Mbps (Megabit per second) of bandwidth, and the price will preferably be in the form of price per unit. However, the price can also be entered in the form of total price for the quantity bid and the unit price can be easily calculated. Because the technique utilizes a second price auction technique, the new bidder will be encouraged to optimally submit a bid that is approximately the bidder's true valuation for the resource. The bidder optimally bids his true value because of the operation of the second price auction mechanism as explained above. The new bid can be submitted electronically over a network such as the Internet or can be entered manually into a computer performing the technique. For example, a new bidder desiring premium bandwidth may type in a bid of $4 per unit for three units of bandwidth into a computer and transmit the bid to the computer operating the technique over a network. A software agent can be programmed to automatically bid according to the user's needs and the market as represented by the other users' bids.

Step 107 retrieves a total quantity (Q) of resource which is being auctioned and which is available for use at one time. For example, if the resource being auctioned is premium bandwidth, the total premium bandwidth for a given ISP system or node may be 20 Mbps. Since there is only a finite amount of the premium bandwidth resource which can be used at one time, no amount of bandwidth over Q can be allocated. The quantity Q can be input manually or retrieved from electronic storage or be calculated by the auction processor. Additionally Q can be a predetermined value in the technique for the resource or can be calculated based upon other parameters. For example, if the resource being allocated is bandwidth, the ISP can monitor how much premium bandwidth is available to be auctioned with respect to the total bandwidth for a given time period. The ISP may increase the percentage of bandwidth which is designated premium. The value Q would then change over time due to the technical or market variables.

Step 109 initially sets the quantity remaining variable ($Q_i$) to equal the total quantity Q. At this point in the technique for processing the new bid, no bandwidth has been allocated with respect to the new bidder according to the technique. The actual bandwidth can be utilized according to prior allocations at the time of the processing of the new bid. The quantity remaining variable $Q_i$ indicates the amount of the resource which has not yet been allocated during the allocation technique for the new bid.

Step 111 identifies the next highest bid ($S_j=(Q_j,P_j)$) where $S_j$ is the $j^{th}$ bid; $Q_j$ is the quantity component of the $j^{th}$ bid; and $P_j$ is the price component of the $j^{th}$ bid. The first time the auction technique performs this step during a particular auction or allocation, the next highest bid identified will be the bid with the highest price included in the bid list. Since the bids have been sorted by decreasing bid price, the first bid in the list should initially be the highest. If the list is implemented as a linked list, a pointer will be pointing to the highest price bid. Notably, the list could be organized in order of decreasing price, or in some other manner. In that case, modifications, which will be apparent to one of ordinary skill in the art, would need to be made to accommodate this organizational approach.

Step 113 checks if the price component of the current identified bid in the list ($P_j$) is greater than or equal to the new bid $S_i$ in the auction. If the current identified bid in the list is greater than or equal to the new bid price, the technique continues with step 115. If the current bid pointed to in the list is less than the new bid price, than the technique continues with step 117.

Step 115 subtracts the quantity component of the current identified bid in the list from the value of the available quantity $Q_i$. Since the price of the current identified bid in the list is greater than the new bid, it will be awarded the quantity of resources that it had requested (to the extent the remaining quantity of resource is not yet assigned to higher bidders during this allocation for the new bid). The amount of the resource which has just been allocated to the higher bid in the bid list is subtracted from the available resource variable $Q_i$. If the new bid price is below previous bids from the bid list which in aggregate request a total allocation that equals or exceeds the available allocation of the service provider (Q), the new bid will be allocated none of the resource because the resource is allocated to the higher bidders. The new bidder will be forced to increase its bid price in a subsequent bid or obtain the resource from another source. If the current identified ($j^{th}$) bid in the list of retrieved bids requests more resource than is currently available as identified in $Q_i$, the entity making the bid will be allocated the remaining portion of the resource. In that case, the bidder will receive some of the resource that was requested, and $Q_i$ will be set to 0.

Step 116 checks if the quantity remaining variable $Q_i$ is equal to zero. If it is equal to zero, then there is no more resource to be allocated to the new bidder $S_i$ and the technique is completed for the new bidder $S_i$ with respect to the bid made. If the auction is still continuing, or if there will be another allocation in the future, the bidder may then increase its bid price and submit a new bid. If $Q_i$ does not equal zero, then the testing of received bids in the list continues and the technique returns to step 111 and the next highest previously submitted bid is identified.

Step 117 is reached if the bid price in the new bid $S_i$ is high enough such that some amount of quantity remains to be allocated at that bid price. For example, if the total allocation was 9 units and the auction computer has previously received bids (quantity, price) of (3, $7), (3, $6), (3, $2), and the current bid $S_i$ is (3, $5), the first two bids of $7 and $6 would each be allocated 3 units and 3 units would remain to be allocated ($Q_i=3$). Step 117 then allocates the proper amount of the resource A to the new bidder $S_i$ by taking the minimum of (1) $Q_i$ (the amount remaining) and (2) $q_i$ (the amount of requested). Thus, the new bid $S_i$ will be assigned the quantity requested to the extent it is available and not already assigned to higher bids previously received. In the example above, the new bidder would be assigned 3 units.

Steps 119 through 123 calculate the price for the new bidder according to the progressive second price auction technique. Step 119 places the new bid in sorted order into the list of bids. For example, the bid could be added to a linked list such that the bid prices are arranged in descending order.

Step 121 then calculates the total cost for the new bidder based upon the progressive second price auction technique. The cost to the new bidder is calculated on an exclusion compensation principle: the new bidder (i) pays for his allocation so as to cover the "social opportunity cost" that is given by the declared willingness to pay (through their bids) of the users which are excluded by i's presence. The operator and supplier of resources at the auction is thus compensated for the maximum lost potential revenue from the new allocation.

Thus in the previous example, if the lowest bid receiving an allocation of resources was $2 for three units before the new bid, these three units would be reassigned to the new bidder who just bid $5 for the three units. The new bidder $S_i$ would then be charged $2 for each unit allocated. If an additional bidder now entered the bidding with a bid of (3, $5.50), the stored bidding list would include the following: (3, $7), (3, $6), (3, $5), (3, $2) with the first three bids being allocated three units each. The new bidder at $5.50 would be allocated the three units of the $5 bidder at a cost of $5 per unit according to the second price auction rule. Thus allocation prices are always based upon the bids of the bidder with lower bids who had previously received an allocation or would have received an allocation but for the new bidder.

Step 121 shows how the cost for a new bidder who is receiving an allocation of the resource is calculated. For each bid with a lower bid price which received an allocation of the resource before the new bid, the bid price is added to the total cost charged to the new bidder until the allocated quantity matches the requested quantity in the bid. This reflects the shift in allocation from the lower bidders to the new bidder with the higher bid. Thus the cost $C_i$ is equal to $C_i$ plus the price of the unit bid times the amount excluded from the allocation of each previous bid. If an allocation of 2 units at $3 is reallocated during the processing of a new bid of 4 units at $4, 2 units will be reallocated for that new bid from the lower bid. The quantities allocated in the next higher bids (but below the new bid price) will then be used to further calculate the total cost of the new bid reflecting the displaced allocation.

For each bid j having a lower quantity component than bid i, an amount $a_j$ is determined as the minimum of the quantity bid by bidder j and the quantity remaining to be allocated ($Q_i$) after allocating to the bidders having a higher bid price than the new bid i. The cost charged to bidder i is calculated, for each bid as $C_i=C_i+P_j\times[a_j-MIN(q_i, Q_i-a_i)]$. The amount to be allocated $a_i$ is then decremented according to $a_i=a_i-MIN(a_i, a_j)$. In step 122, $Q_i$ is decremented according to: $Q_i=MAX(Q_i-q_j, 0)$.

Step 123 then identifies the next lower $P_j$. The process then continues with step 125. Step 125 checks if $a_i$ (the amount remaining be reallocated) is zero or if no lower bids exist. If one of these conditions is true, then the process is complete for the new bid. If there are additional lower $P_j$ to process and there is some resource which is to be reallocated, the process continues with step 121.

Figure 2:
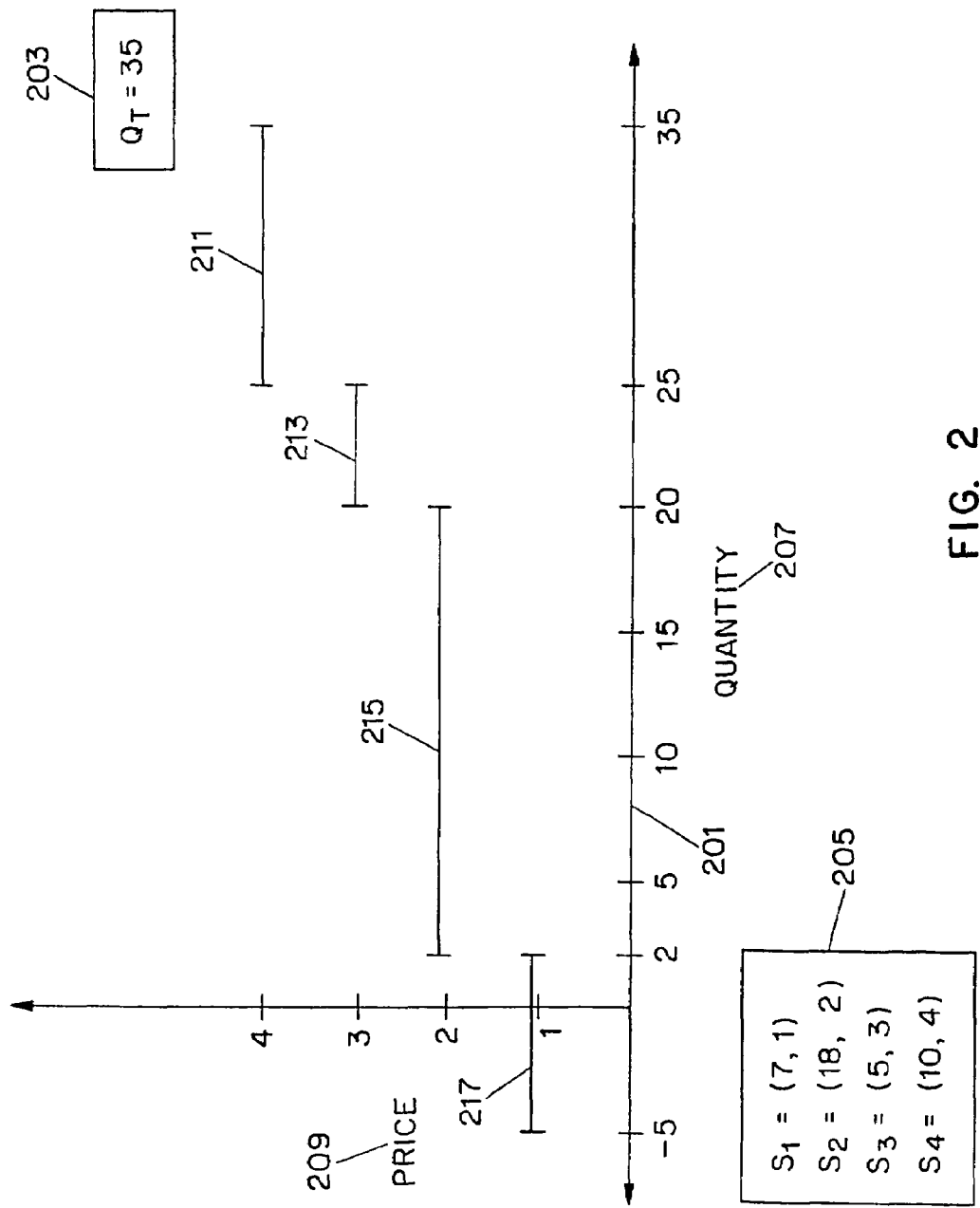
FIG. 2 is a graphical example of an allocation of resources.
Figure 3:
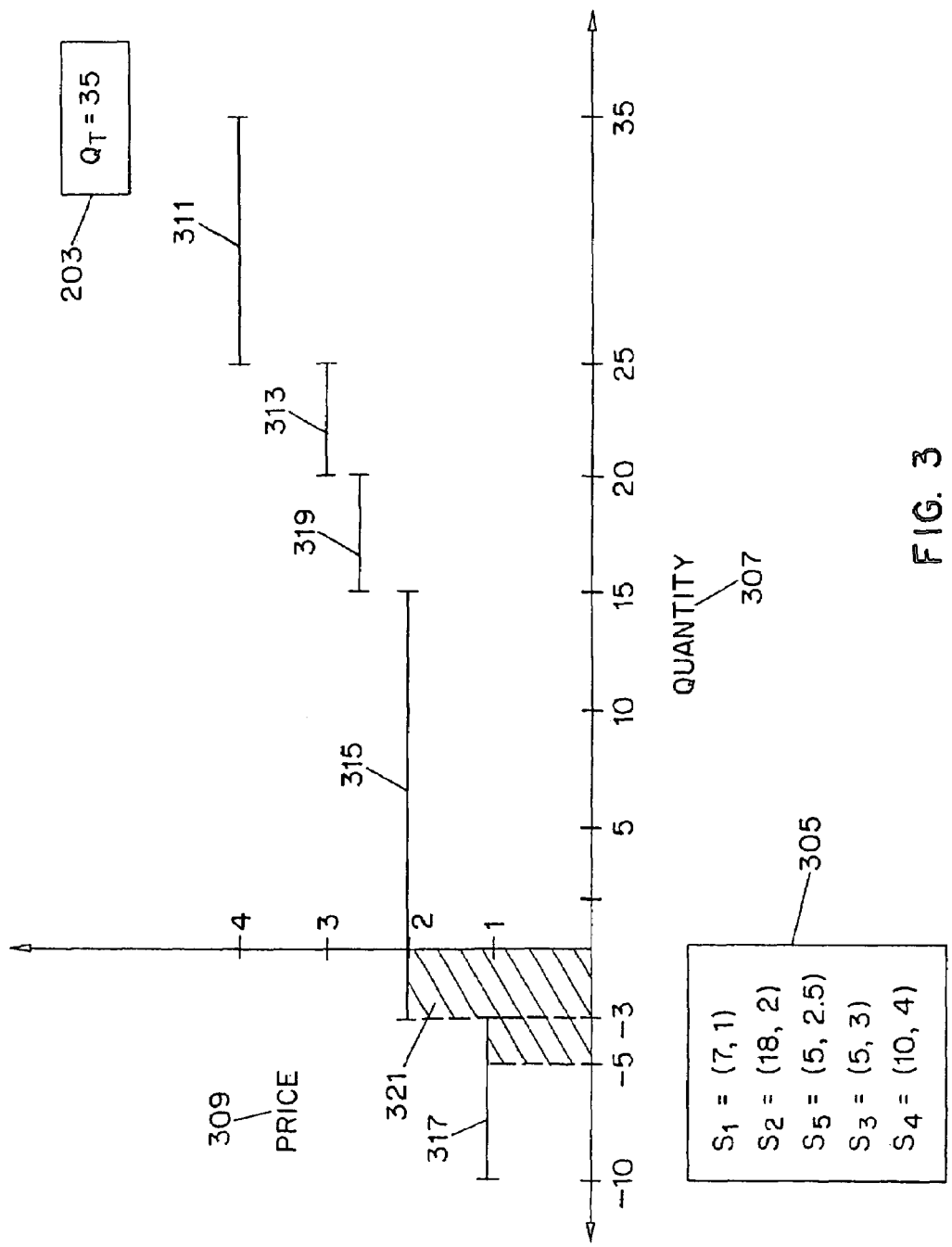
FIG. 3 is another graphical example of an allocation of resources.

FIGS. 2 and 3 are graphical examples of the change in an allocation of resources in response to a new bid being processed and illustrate the technique for determining the cost to be charged to a new bidder. FIG. 2 depicts a prior allocation of resources based upon previous bids before the new bidder has entered the auction a new bid is processed. In this example, the total quantity of resources ($Q_T$) is thirty-five units as indicated in box 203. In this example, the following bids are retrieved as indicated in box 205: the first retrieved bid $S_1$ is for 7 units at $1 per unit; the second retrieved bid $S_2$ is for 18 units at $2 per unit; the third retrieved bid $S_3$ is for 5 units at $3 per unit and the fourth retrieved bid $S_4$ is for 10 units at $10 per unit. Note that in this example, the bids are listed by increasing price, rather than decreasing price as previously described.

Graph 201 shows a horizontal axis indicating bid quantity 207 and a vertical axis indicating bid price 209. The bids located to the right of the vertical axis are allocated a portion of the resource being auctioned. The bids are initially allocated according to the highest bid price. Thus the fourth bid $S_4$ (the highest bid price) is indicated by bar 211. Bar 211 shows that the entire 10 units requested by the bid have been allocated. Bar 213 shows the allocation for the third bid $S_3$ which received all of its five requested units. Bar 215 shows the allocation for the second bid $S_2$ which received all of its 18 requested units. After the bids $S_4$, $S_3$ and $S_2$ were allocated, only two units remained unallocated (35−10−5−18=2). Thus, bar 217 indicates two units being allocated to bid $S_1$ and five units requested by $S_1$ not receiving an allocation (shown to the left of the vertical axis). The price levels on the graph indicate the bid price and the not cost actually charged to the bidder, which is calculated in accordance with the principals described herein.

FIG. 3 shows a graphical example of how the allocation changes if a new fifth bid comes into the auction as $S_5$ (5, $2.50) according to the present technique. FIG. 3 shows the graph 201 from FIG. 2, but now with the new allocation after the processing of the new bid $S_5$. Graph 301 has a horizontal axis indicating bid quantity 307 and a vertical access indicating the bid price 309. The total level of quantity available $Q_T$ is still 35 units as indicated in box 203. The new bid $S_5$ is shown in the bid list 305 and is placed in the order of prices bid. Bid $S_5$ with a bid price of $2.50 is shown between $S_2$ and $S_3$. The graph now reflects the allocation to each bid after the new bid is taken into account.

After the processing of bid $S_5$, the entity making bid $S_4$ is still allocated 10 units as shown by bar 311. The entity making bid $S_3$ is again allocated 5 units as shown by bar 313. The next highest bid is $S_5$ so the bidder of $S_5$ is allocated the five units requested as shown by bay 319. Between $S_4$, $S_3$ and $S_5$, twenty units have been allocated thus only 15 units remain (35−10−5=15). The maker of the next highest bid, $S_2$, has requested an allocation of 18 units. However, only 15 units remain to be allocated, so $S_2$ receives only 15 units as shown by bar 315. This is three less than was previously allocated to this bidder in the example shown in FIG. 2. The entity making bid number one, who requested seven units, is now allocated zero units as shown by bar 317, which is to the left of the vertical axis.

The cost of the new allocation to new bidder $S_5$ is the amount displaced by the reallocation, shown in crosshatch 321 in FIG. 2. Thus the total cost for the five units reallocated and displaced by the bid $S_5$ is (3 units×$2)+(2 units×$1)=$8. The unit cost for the fifth bidder $S_5$ is the total cost divided by the number of units allocated or 8/5=$1.6. Thus bidder five will pay $1.6 per unit even though he bid $2.5 per unit according to the progressive second price auction technique.

Because the allocation and actual price paid are based upon other bids for the resource, the auctioneer can submit its own floor bid to buy the resource at a particular price. This will stop initial bidders from acquiring the resources for too low a price and will allow the auctioneer to influence the price paid by others. The floor price must be set at an appropriate level or the auctioneer may not sell the resources to other bidders at all.

The progressive second price auction technique meets the requirements of an efficient pricing system by allowing for varying bids by the bidding entity and allowing a bidder to specify the quantity requested, having resource prices which are responsive to the market conditions and limiting restraints on efficiency.

In order to make efficient bids in an auction that is being carried out on a continuous and quick manner such as auctioning bandwidth, a valuation technique can be used to quickly enter the bids of a bidder into an electronic auction to get an efficient result. Each player i has a valuation of the resource $\theta_i$ ($a_i(s))\geq 0$ which is the total value of the allocation received. A bid profile can be created to get a utility $U_i(s)$ where $U_i(s)=\theta_i(a_i(s))-C_i(s)$ which is the value minus the cost. Additionally, bidders can have a budget constraint of the total cost which can be spent for a resource for a period of time so that the total cost of the bids must be under the budget parameter b.

Figure 4:
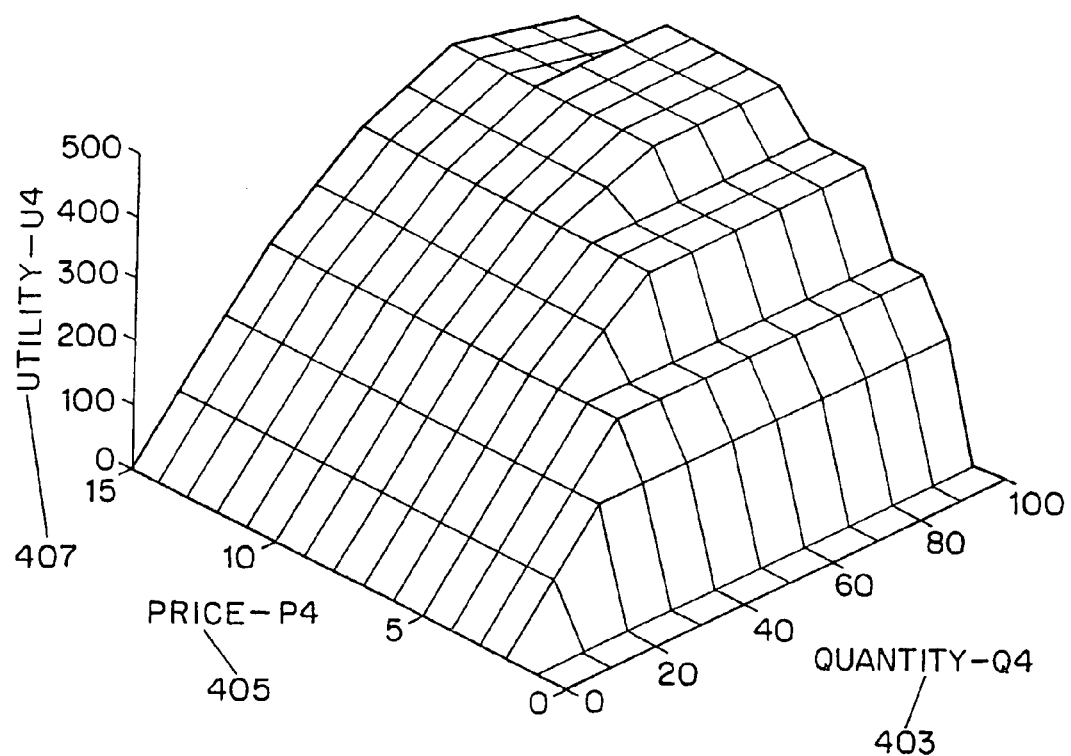
FIG. 4 is a graph of a player's utility function for entering the auction as a function of possible bid prices and requested quantities.

FIG. 4 shows a graph 401 of a player's utility function for entering the auction at a particular bid price. In the auction in this example, there are five other bidders with the following bids: $S_1=(100, 1)$; $S_2=(10, 2)$; $S_3=(20, 4)$; $S_4=(20, 7)$ and $S_5=(30, 12)$. The new player $S_6$ has a valuation function of $\theta_6(q)=10q$ (or $10 per unit). The plateaus at the top of the graph 401 show where the quantity requested by the new bidder can no longer be increased at that bid price because they have been allocated to other bidders. Graph 401 has three axis: quantity 403, price bid 405 and utility 407. While the new bid price is under ten, the utility is increasing as shown in the figure. However, if the price of the new bid has a price component over 12 in order to get additional quantity, the overall utility for each extra unit decreases because the most the bidder is willing to pay for an allocation of resources is ten dollars per unit. The utility graph can be shown in another form as in FIG. 5.

Figure 5:
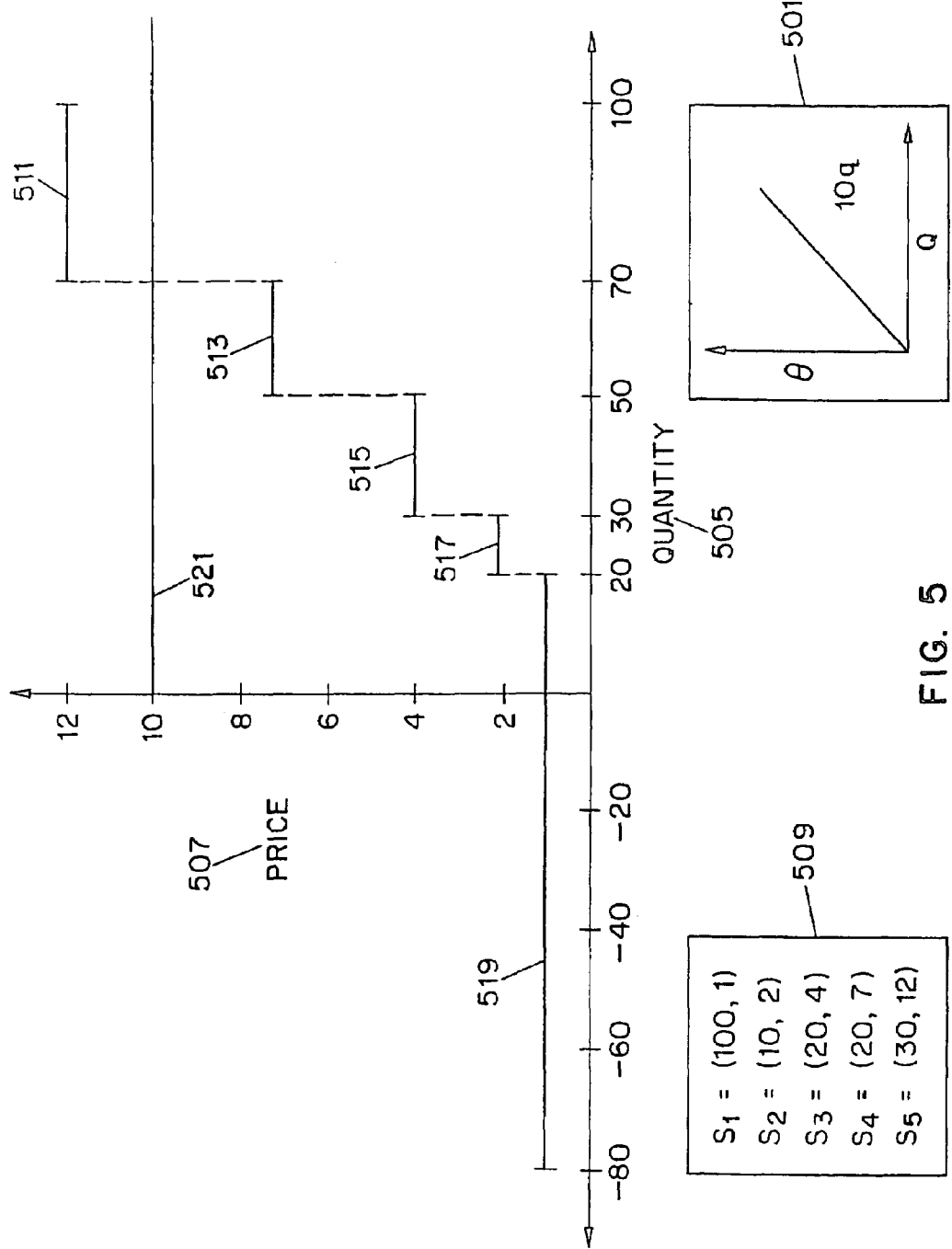
FIG. 5 is a graphical example of an allocation of resources.

FIG. 5 shows an allocation graph similar to the graphs shown in FIGS. 2 and 3. Box 501 shows the valuator function 10q (or ten times the quantity) where the quantity is shown on the horizontal axis and utility is shown in the vertical axis. In the graph 503, the bids discussed in the example of FIG. 4 are shown. The horizontal axis indicates quantity allocated 505 and the vertical axis is the price of the bid 507. The total quantity to be allocated is one hundred units. The bids for the auction are indicated in box 509. The allocation to bid $S_1$ is indicated by bar 519; the allocation to bid $S_2$ is indicated by bar 517; the allocation to bid $S_3$ is indicated by bar 515; the allocation to bid $S_4$ is indicated by bar 513 and the bid $S_5$ is indicated by bar 511. Bid $S_1$ is only allocated twenty units of all of the overall units bid. In order to determine the optimal bid by a new player $S_6$ having a valuation function shown in box 501, the derivative of the valuation function is taken to determine the slope of the demand. The derivative of the new bidder's valuation function is shown in graph 503 as line 521. Every quantity indicated in a bar below line 521 is more valuable to the new bidder than those quantities bid by other bidders with lower price components. Thus the new bidder would want to bid $10 in order to obtain seventy of the total units which includes the twenty units of line 513, the twenty units of line 515, ten units of line 517 and twenty units of line 519. Additional units could cost above the calculation for the unit so a higher bid would not be efficient. The actual cost which the new bidder will pay is calculated using the technique described previously. The thirty units shown by bar 511 were bid at a price of $12 which is above the price of $10, the utility derived by the new bidder. Thus the new bidder would obtain 70 units. While a straight line derivative function is shown in the example, more complicated valuation functions can be used to model the correct bidding strategy in a similar manner.

Auctions, as formulated here, are applicable in a setting where the resources are arbitrarily divisible. Thus, this approach would fit well in a system where arbitrary amounts of resources can be requested and obtained, such as in pricing of the "expected capacity" profiles in the Internet with differential service.

For network resource allocation which is time based, bidding could be for example on a per flow basis or per unit time on an appropriate time scale. A flow level model can be used particularly if the entity in the auction is a software bidding agent, possibly embedded into a software application, which develops (over time and with human feedback) an accurate estimate of the entity's utility function θ, the relationship between resources and value or perceived level of service.

An example of a flow level auction includes an agent-based system implemented in a common programming language and a seller which is an ISP whose network has a bottleneck bandwidth (maximum resource capacity) of 45 Mbps. The example described is an actual auction performed using the progressive second price auction mechanism. Using a flow level service model, the ISP allocates capacity to all its users. In that service model, the allocation is a traffic profile for each user, enforced by a profile meter at the point of connection to the network. The network offers premium service to all in-profile packets (e.g. lower loss and/or delay) and any out-of-profile traffic gets best-effort service. The provider must provision the network to carry all the in-profile traffic that it expects at a given time, or conversely, must not sell more capacity ("μm" of profiles) than it has in the worst case scenario. Depending on how strictly the ISP wants to honor the contract and how well it can predict the routes it expects the traffic to take, it will sell a total capacity which is equal or greater than the bottleneck capacity. In this example it is assumed the ISP is extremely conservative, so it will only sell 45 Mbps so that all units sold will be supplied. In addition the ISP must ensure that it in turn purchases a large enough profile from neighboring networks to ensure that the in-profile traffic of its users get the contracted service even after it leaves its network. The reserve price po corresponds to the price paid by the network to get capacity from neighboring networks.

The profiles for the bidders in this example can be any traffic descriptor. For example, the allocation can give the users a minimum guaranteed bandwidth (which will be the allocated quantity), with each user being allowed to burst up to their physical line rate. This can be done for example with a "leaky-bucket" traffic meter. If the bucket sizes are fixed by the ISP, and users are allocated (and pay for) a token rate. The bucket size determines the maximum in-profile burst size, and would correspond to the worst case buffer occupancy—or delay—that the ISP can tolerate for premium traffic. Clearly the quality of service for most internet traffic will be better if the allocated premium bandwidth is increased. But, because the profile allows for bursts, the improvement in quality will decrease as the premium bandwidth approaches the physical line rate, and of course, there is no use in having a premium bandwidth greater than the peak rate. Therefore, a reasonable model of a bidder's valuation is strictly increasing and concave up to the peak rate, and flat above the peak rate ("Bidding Valuation Curve").

To represent a realistic range of the connection speeds of users who would request premium bandwidth from home or small business users to a peer network connecting with a T3 line, the user population in this example has line rates $q_i \in \{256$ Kb/s, 1.5 Mbps, 45 Mbps$\}$. ISPs currently charge $T_1$ connections at flat rates of $500–$1500 per month. This works out to $0.008–$0.023 per Mbps per minute. Similarly, dial-up users are charged flat-rates of $10–$30 per month for 30 Kbps connections, which works out to $0.007–$0.021 per Mbps per minute. The closeness between the two cases indicates that these flat rates are rough indications of average valuations. The operator of the auction can also charge a small amount to process each bid.

The following bidding technique can be used as a strategy by an entity bidding in the progressive second price auction: if the utility for the bidder is increased by increasing the bid price or quantity requested and still remain within budget, submit a new bid with increased price and/or quantities.

The order of the bids is inconsequential for the bidding technique. Bidders join the auction at different times and bid, for example, once per second. This, along with communication delays which make the times at which bids arrive at the server and updates at the clients essentially random times, make the distributed auction asynchronous.

The above described bidding technique can be described as selfish and short-sighted. It is selfish because it will submit a new bid if and only if it can improve its own utility (by more than the fee for the bid) and short-sighted because it does not take the extensive form of the auction into account, i.e., does not use strategies which may result in a temporary decrease but a better utility in the long run by tactically exploiting other users.

In this example, the total capacity is Q=45 Mbps. A bid fee is the fee paid to the operator of the auction to make the bid. It is typically a relatively small amount relative to the bid price. The bid fee in this example is $\epsilon=\$0.00125$. All times for the example are in seconds. In this example, the auction is run with one agent (bidding computer) per user, and the agents are distributed evenly on different workstations. The auctioneer agent (processing computer) runs alone on a separate workstation such as a Sun Ultra-2 SPARC workstation. "Arrivals" of new players correspond to Internet users whose profile was zero (pure best-effort) who have not been bidding who suddenly request a bidding profile. This could be for example users who are content with best effort traffic at night and on weekends, but require better bandwidth during business hours.

In this example, we begin at $t_o<0$ with a population consisting of:
(1) 20 users (bidders 1–20) with a peak rate of 1.5 Mbps
(2) 2 users (bidders 21 and 22) with a peak rate of 45 Mbps
(3) 50 users (bidders 23–72) with a peak rate of 256 Kb/s The valuations for each player follow the Bidder Valuation Curve, as described above. We let this set of users bid according to their valuations until an equilibrium is reached (i.e., no new bids have been received for a few minutes), at some time t<0. We then show the affect of new players with bids entering and leaving the auction as shown in FIG. 6.

Figure 6:
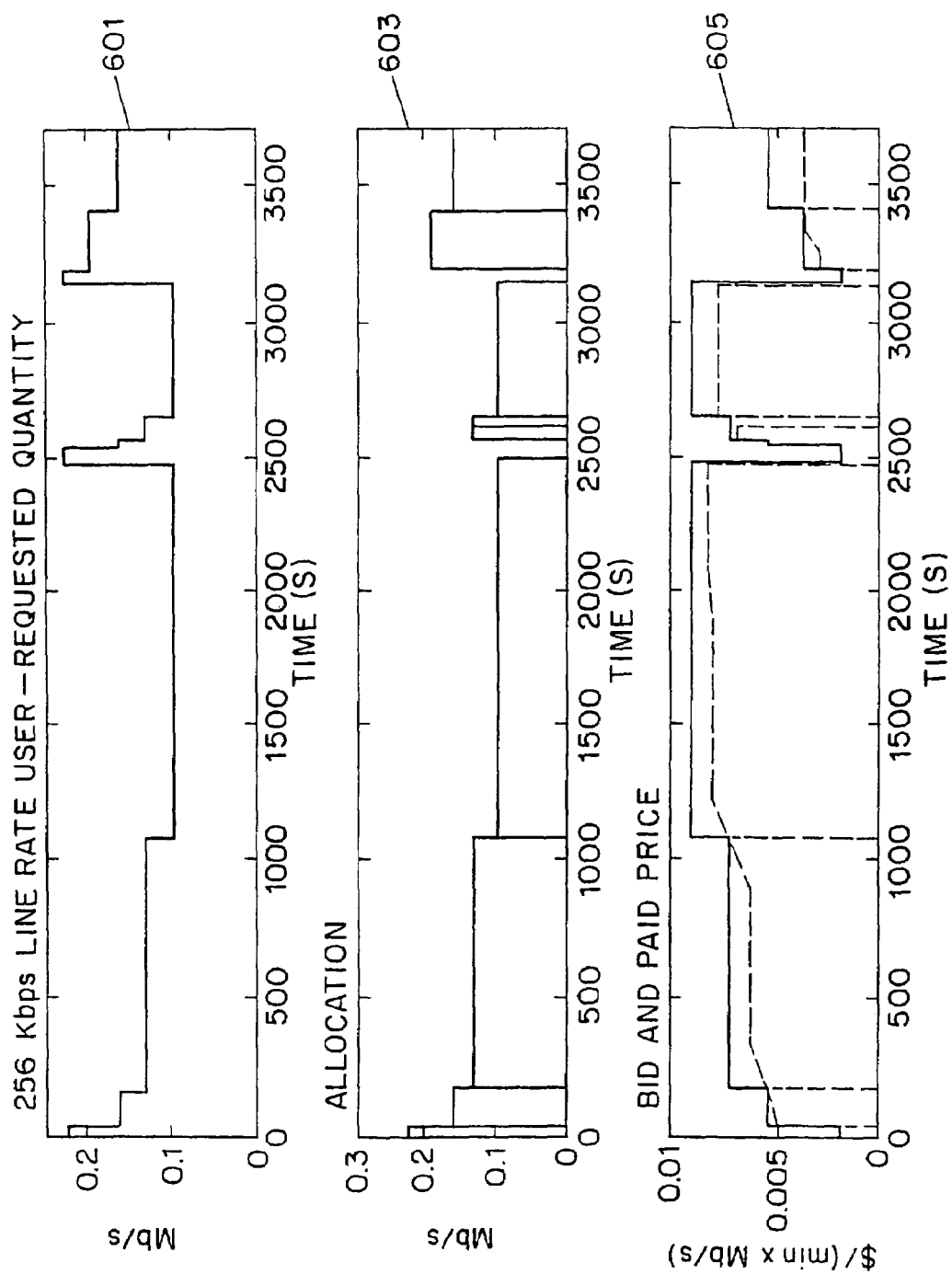
FIG. 6 shows three graphs indicating the affect of a new bidder on the allocation of a resource.

FIG. 6 shows three graphs showing the affect of the new small user on the auction. Graph 601 shows the requested quantity of bandwidth allocation for the 256 Kb/s line rate user. The horizontal axis for graph 601 is time and the vertical axis is bandwidth request. Graph 603 shows the allocation for the new bidder. The horizontal axis for graph 603 is time and the vertical axis is bandwidth allocated. Graph 605 shows the bid and paid price for the bandwidth. The horizontal axis for graph 605 is time and the vertical axis is dollars per (minutes×Mbps). The bid price is indicated by the solid line and the paid price is indicated by the dotted line. The paid price (cost) line is lower than the bid price because of the progressive second price auction process being used. The bid price and paid price are close to one another because of the relatively large number of bidders in the auction.

Figure 7:
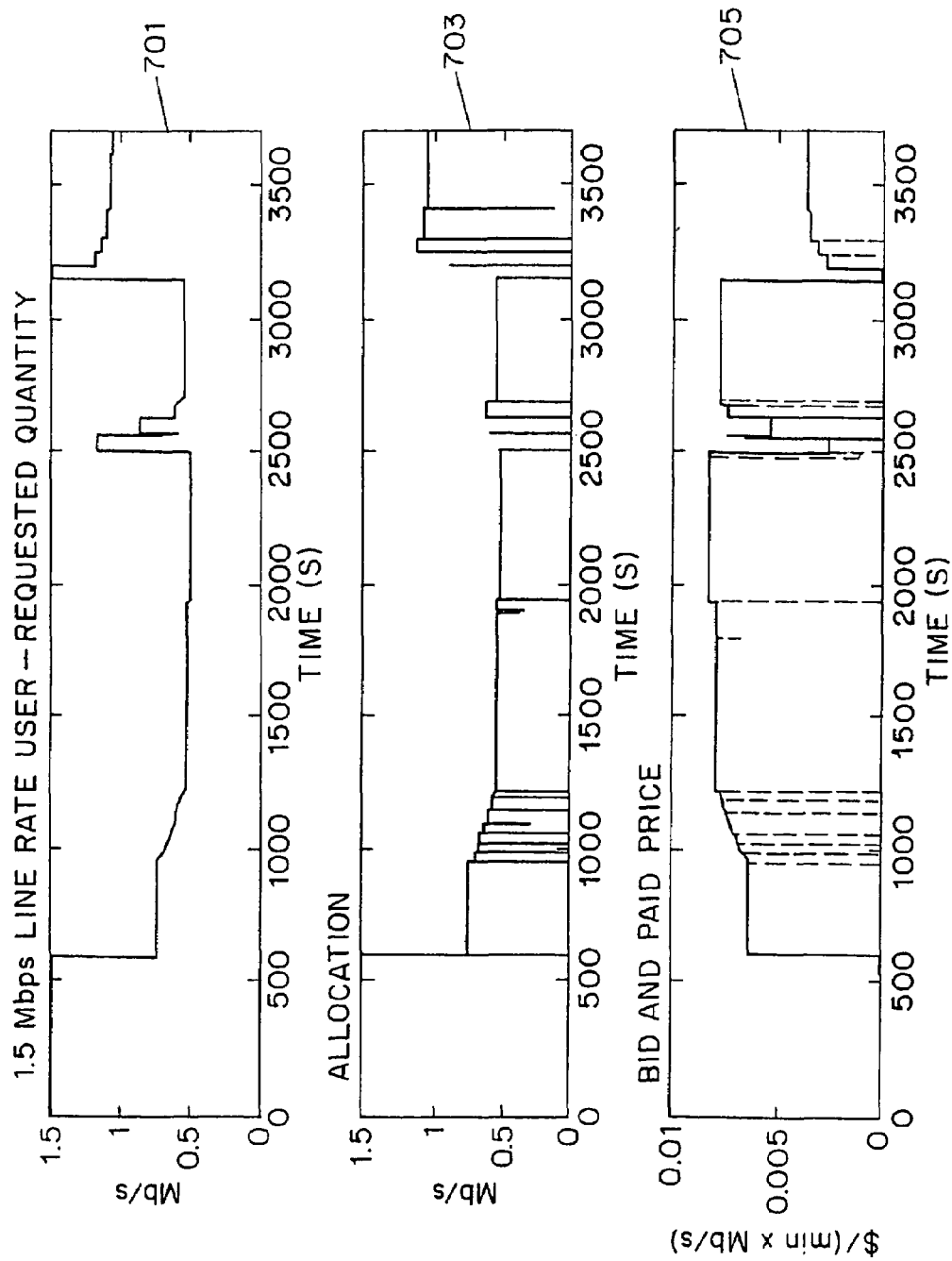
FIG. 7 shows three graphs indicating the affect of a new bidder in the auction.

FIG. 7 shows three graphs showing the affect of the new small user on the auction from a different perspective. Graph 701 shows the requested quantity of bandwidth allocation for the 1.5 Mbps line rate user. The horizontal axis of graph 701 is time and the vertical axis is bandwidth request. Graph 703 shows the actual allocation for the new bidder. The horizontal axis of graph 703 is time and the vertical axis is bandwidth allocated. Graph 705 shows the bid and paid price for the bandwidth. The horizontal axis of graph 705 is time and the vertical axis is dollars per (minutes×Mbps). The bid price is indicated by the solid line and the paid price is indicated by the dotted line. The paid price (cost) line is lower than the bid price because of the progressive second price auction process being used. The bid price and paid price are close to one another because of the relatively large number of bidders in the auction.

Figure 8:
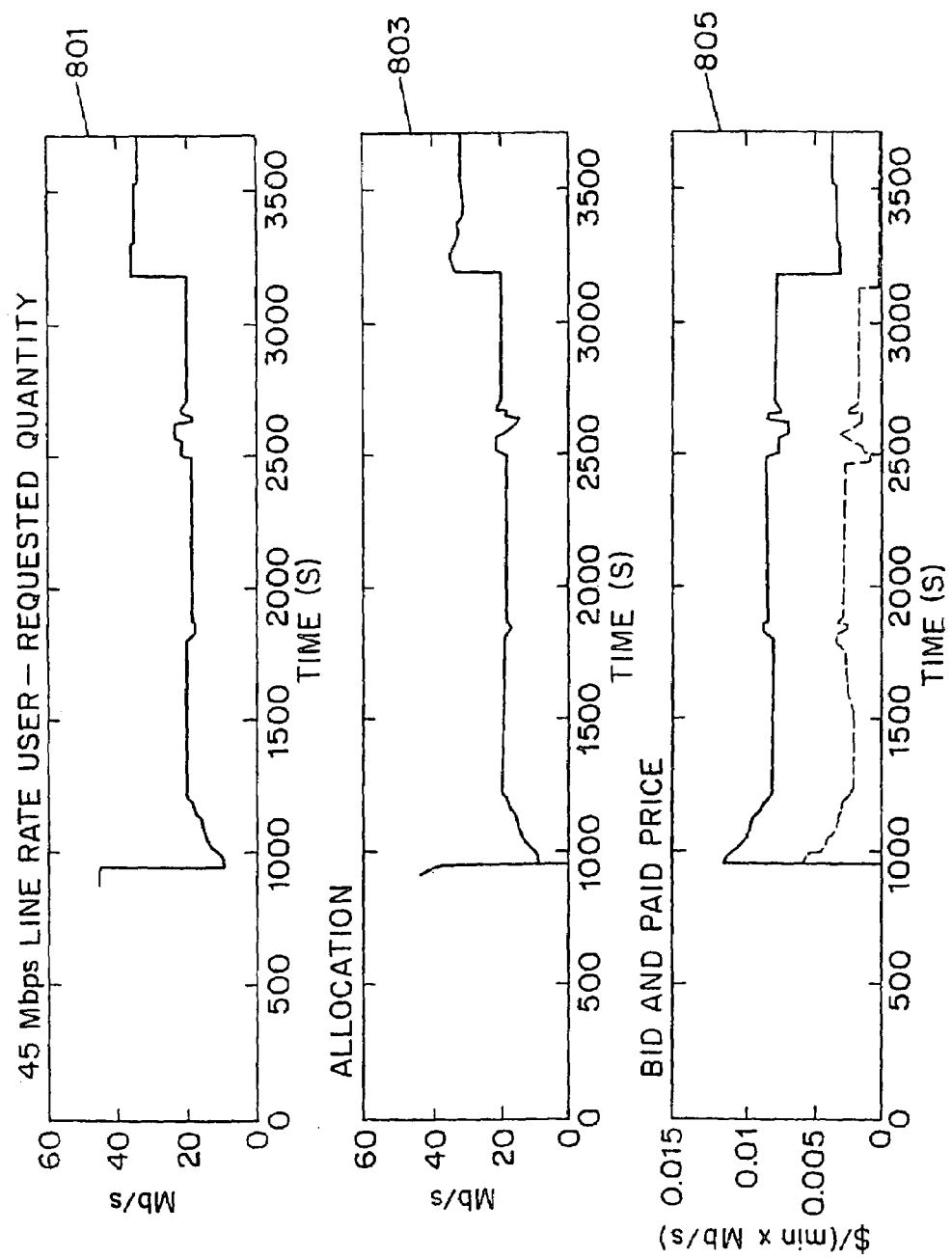
FIG. 8 shows three graphs indicating the affect of another new bidder in the auction.

FIG. 8 shows three graphs showing the affect of the new small user on the auction from a different perspective. Graph 801 shows the requested quantity of bandwidth allocation for the 45 Mbps line rate user. The horizontal axis of graph 801 is time and the vertical axis is bandwidth request. Graph 803 shows the actual allocation for the new bidder. The horizontal axis of graph 803 is time and the vertical axis is bandwidth allocated. Graph 805 shows the bid and paid price for the bandwidth. The horizontal axis of graph 805 is time and the vertical axis is dollars per (minutes×Mbps). The bid price is indicated by the solid line and the paid price is indicated by the dotted line. The paid price (cost) line is lower than the bid price because of the progressive second price auction process being used. The bid price and paid price are close to one another because of the relatively large number of bidders in the auction.

The following events in this example are reflected by the changing allocations to the different bidders as shown in FIGS. 6, 7 and 8:

(1) At t=0, player 73 (a new 256 Kb/s user) joins. Initially, the new user assumes the market is empty, so he asks for a large profile. As his knowledge of the opponent profile is updated (received by the processor of the auction), he realizes this is too expensive, decreases his quantity, and raises the bid-price. FIG. 6 shows that after three bids by the new player (and reactions by others), the market has stabilized at a new equilibrium by t=170, where player 73 has an allocation of a premium bandwidth $a_{73}=128$ Kb/s.

(2) At t=550, player 74 (a new 1.5 Mbps user) joins. FIG. 7 shows that after two bids by player 74, by t=600, a new equilibrium is reached with $a_{74}=728$ Kb/s. At this new equilibrium, the unit price paid by player 73 is increased slightly from 0.00625 to 0.00629 (barely visible on FIG. 6).

(3) At t=890, player 75 (a new 45 Mbps user) joins. Unlike the previous two this large arrival has a significant impact on the market. FIG. 8 shows that by t=1200, after 28 bids by the new player, a new equilibrium is reached, where $a_{75}=19$ Mbps. At the new equilibrium, player 74's share of the premium bandwidth drops from 728 Kb/s to 540 Kb/s, and the price paid per unit to rises from 0.0063 to 0.008.

(4) Between time t=1600 and 1700, 50 new users with peak rates of 256 Kb/s join the game. This causes the market to fluctuate for a few minutes, and a new equilibrium is reached where the prices are slightly higher, and allocations slightly lower for the existing players (see FIG. 6 to FIG. 8).

(5) Just before t=2500, players 1–20 (all 1.5 Mbps line rate) suddenly leave. This causes a sharp drop in the market, which takes about 200 seconds to stabilize. The subsequent equilibrium is not much different from the previous one, in terms of both allocations and prices, despite the fact that potential demand has been reduced by about 30 Mbps. This is because many users with lower valuations who were not fully satisfied before now use up the freed capacity, and there is still enough unsatisfied demand just below the market clearing price to keep prices at almost the same level.

(6) At t=3140, players 21–22 (both 45 Mbps rate) suddenly depart. The freed capacity is enough to satisfy a lot of pent-up demand, so the prices drop by about half, to around $0.004, and allocations increase for the remaining players.

Note that throughout this example, of the three players described, the T3 user (player 75) pays a lower price per unit than the other two. This "volume discount" occurs because of the greater bandwidth allocation to player 75 and the fact that in the progressive second price auction mechanism more lower price bidders are being displaced by the higher quantity requested.

These examples show that the impact of many small independent users is much smaller on the market dynamics than that of a single user with the same total demand. For each small user, his inability to "move" the market with his bid makes it in effect equivalent to a retail market. This suggests that for the smallest users, the market can be approximated by simply advertised prices (which arise from the interaction among medium and large users), and the user making a simple choice of whether to buy or not. This is indeed what occurs with most commodities (e.g., oil).

The progressive second price auction generalizes key properties of traditional single non-divisible object auctions to the case where an arbitrarily divisible resource is to be shared. The allocation technique assuming an elastic-demand model of user preferences constitutes a stable and efficient allocation and pricing mechanism in a network context, both for Virtual Path/Virtual Network and edge capacity pricing applications.

Figure 9:
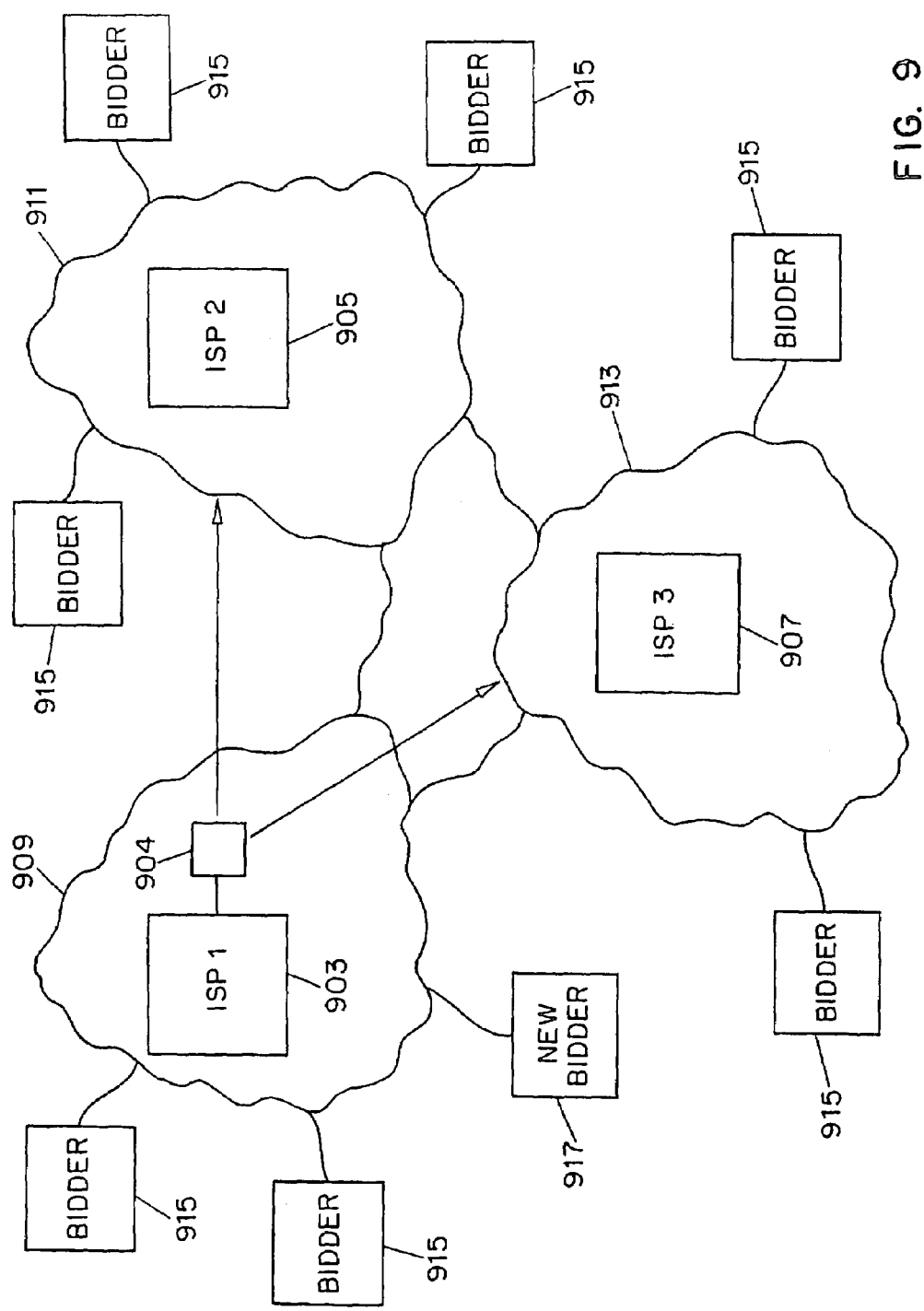
FIG. 9 shows a system of bidders and prices at the auction.

FIG. 9 is a diagram of an example of a system which can use the progressive second price auction technique. System 901 includes Internet Service Providers ISP1 903, ISP2 905 and ISP3 907. Each Internet Service Provider is connected to a network. ISP1 903 is connected to network 909, ISP2 905 is connected to network 911 and ISP2 907 is connected to network 913. Bidding entities 915 are computers which are connected to a network (either network 903, 905 and 907) and participate in auctions by sending electronic bids including a quantity request component and a bid price component to the ISP to which they are connected. The bids can be individual bids or in the form of a valuation data expressed by multiple price component and quantity component bids or a valuation function expression. The bidding entities 915 include a central processing unit and memory which stores a set of instructions for formulating and transmitting the bids to the auction processor (in this example the ISP). An ISP can also transmit auction updates to the bidding entities 915. System 901 can be used to auction premium bandwidth by an ISP.

The Internet is made up of a number of networks connected together such that a message will eventually be transmitted from a sending party to a receiving party. Thus if a bidder is bidding on premium bandwidth, a message will typically need to travel over numerous networks to reach its destination. Thus the premium bandwidth must be allocated by each network and the bids required to secure the overall connection contribute to the complete cost.

Figure 10:
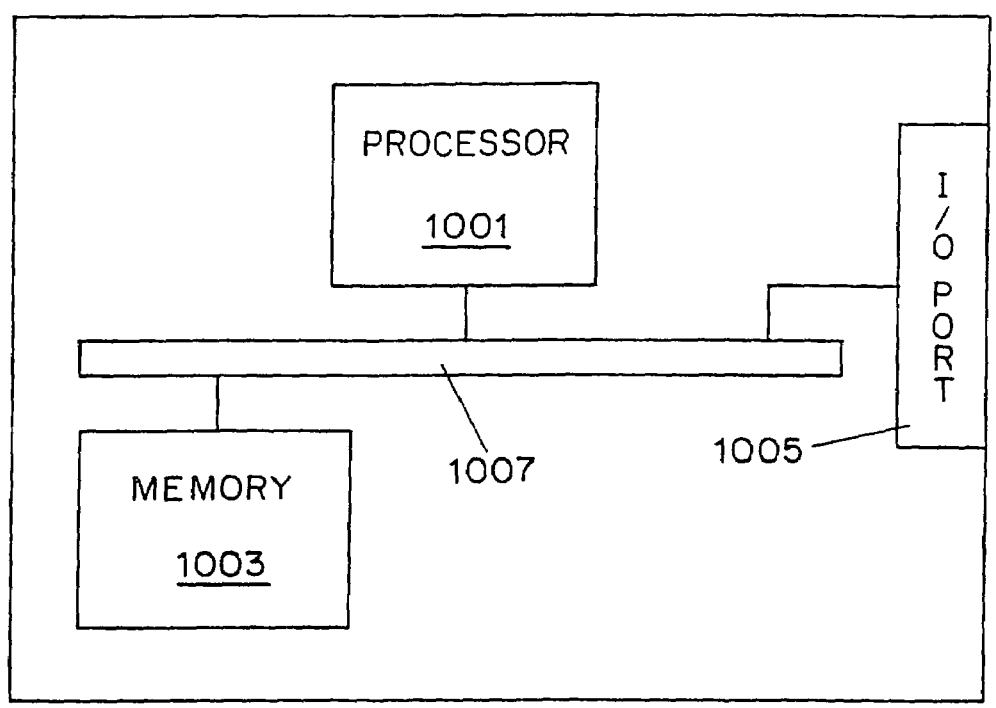
FIG. 10 shows a diagram of a computer which could process the auction in accordance with the invention.

For the purpose of this auction example, each ISP is requested by a computer which includes a processor and memory and is described in more detail in the description of FIG. 10. If a bidding entity wants to transmit information to an entity that is not directly connected to the transmitting entity's ISP, the ISP needs to secure their proper bandwidth from the intervening and destination ISP. This is accomplished by the ISP becoming a bidding entity itself (as shown by box 904) where the ISP bids for another's ISP bandwidth in order to ensure that the data flow bandwidth will be allocated for the entire connection, not just through the ISP's connections. Thus ISP 903 will act as a bidding entity 904 for the auctions performed by ISP2 905 and ISP3 907 if the bandwidth from those ISPs is required by the bidders in ISP's auction. An alternative arrangement is to have the bidder place bids himself in each of the ISP auctions. However, this leads to inefficiencies if the network path includes many ISPs who must allocate the bandwidth for the data exchange and the bidder is only connected to one ISP.

New bidding entity 917 is a bidder who has just entered the auction preferably after a number of other bids have been submitted. However, the new bidder 917 can also be the first entity to enter the auction. In the latter case there is preferably a floor bid which is provided by the ISP which is operating the auction.

FIG. 10 is a diagram of an Internet Service Provider computer. The ISP network bandwidth is controlled by a computer which may include a central processing unit 1001, a memory 1003 connected to the CPU 1001, an input/output (I/O) port 1005 and a databus 1007 connecting processor 1001, memory 1003 and I/O port 1005. In the example of allocating premium bandwidth, the ISP computer can operate the progressive second price auction technique. Program instructions implementing the progressive second price auction technique are stored in memory 1003 which are executed by processor 1001 to perform the technique as described in connection with FIG. 1. As the ISP receives bids for an auction, the bids can be stored in memory 1003. Alternatively, the bids can be stored in a memory outside of the ISP but which is accessible to the ISP. I/O port 1005 is connected to one or more networks that the Internet Service Provider manages.

Memory 1003 also can store data related to the allocation process such as the maximum amount of the resource which can be allocated, the present allocation of the resource and the past history of the allocation and payments made to the ISP after the bids have been accepted. Processor 1001 can perform the calculation necessary to perform the allocations and calculate the costs of a new bidder using the progressive second price auction technique.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example even though this application describes solving problems of bandwidth and buffer space reservation in a communication network, the auction technique is formulated in a manner which is generic enough for use in a wide range of situations.

What is claimed is:

1. A method of allocating an arbitrarily divisible resource comprising the steps of:

receiving first data indicative of at least one bid comprising a quantity component indicating a requested quantity of said resource, and a price component;

receiving second data indicative of a new bid comprising a quantity component, a price component, and a bid fee;

first providing at least one portion of said resource to each of said at least one bid having a price component higher than the price component of said new bid;

second providing a second portion of said resource to said new bid responsive to said first providing step;

calculating by a computer processor said new bid's cost as a function of the price data component of said at least one bid having a price component lower than said price component of said new bid that does not receive the entirety of the quantity of said resource requested in said at least one bid's quantity component as a result of said second providing; and storing cost data indicative of said new bid's calculated cost.

2. The method of claim 1, wherein said resource is bandwidth.

3. The method of claim 1, wherein the amount of said second portion and said calculated cost are transmitted to an entity who made said new bid.

4. The method of claim 1, wherein said second portion of said resource is utilized by an entity associated with said new bid.

5. The method of claim 1, further comprising a step ordering said at least one bid corresponding to said first data by said at least one bid's price component.

6. The method of claim 1, further comprising the step of retrieving data indicative of said resource's maximum capacity and wherein said first and second providing steps are responsive to said maximum capacity.

7. The method of claim 6, wherein said resource is provided to said new bid only if said first portion of said resource is less than said maximum capacity.

8. The method of claim 1, wherein said resource is provided in a first allocation before said new bid is processed.

9. The method of claim 8, wherein said new bid's cost is calculated as a function of at least one previously allocated bid corresponding to said first data having the lowest price component of bids that previously were provided with a portion of said resource in said first allocation, but which were not allocated said portion due to said second providing step.

10. The method of claim 9, wherein said new bid's cost is calculated as a function of the total cost that would have been paid by the submitter of said at least one previously allocated bid for said portion of resource if said submitter had paid the amount it bid for said previously allocated portion.

11. The method of claim 1, wherein said new bid's cost is calculated as a function of a plurality of bids corresponding to said first data having price components that are lower than said new bid's price component.

12. The method of claim 1, wherein said new bid's cost is calculated as a function of at least one bid corresponding to said first data having the lowest price component that would have received an allocation of said resource if said new bid was not received.

13. The method of claim 12, wherein said new bid's cost is calculated as a function of a plurality of bids corresponding to said first data having price components that are lower than said new bid's price component.

14. The method of claim 1, wherein one of said at least one bid is submitted by a processor performing said first and second allocation steps.

15. The method of claim 1, wherein said at least one bid comprises valuation data comprising a plurality of price components associated with a plurality of quantity components.

16. The method of claim 15, wherein said first and second providing steps are responsive to said plurality of price components and said quantities components.

17. The method of claim 1, wherein said new bid comprises valuation data comprising a plurality of price components associated with a plurality of quantity components.

18. The method of claim 17, wherein said second providing step is responsive to said new bid's plurality of price components and said quantity components.

19. An apparatus for allocating an arbitrarily divisible resource comprising:
   means for receiving at least one first bid comprising a quantity component and a price component;
   means for receiving a new bid comprising a quantity component and a price component;
   means for receiving a bid fee associated with said new bid;
   means for first providing a first portion of said resource to each of said at least one bid having a price component higher than the price component of said new bid;
   means for second providing a second portion of said resource to said new bid responsive to said first allocation step; and
   computer processor for calculating said new bid's cost as a function of the price data component of said at least one bid having a price component lower than said price component of said new bid that does not receive the entirety of the quantity of said resource requested in said at least one bid's quantity component as a result of the operation of said means for second providing.

20. The apparatus of claim 19, wherein said resource is bandwidth.

21. The apparatus of claim 19, further comprising means for ordering said retrieved at least one first bid by said bid's price component.

22. The apparatus of claim 19, further comprising means for retrieving said resource's maximum capacity and providing an allocation of said resource responsive to said maximum capacity.

23. The apparatus of claim 22, wherein said resource is allocated to said new bid by said means for second providing only if said first portion is less than said maximum capacity.

24. The apparatus of claim 19, wherein an initial allocation of said resource is completed by said means for first providing before said new bid is processed.

25. The apparatus of claim 24, wherein said computer processor calculates said new bid's cost as a function of at least one of said at least one first bid having the lowest price component that was provided with at least a portion of said resource in said initial allocation.

26. The apparatus of claim 25, wherein said computer processor calculates said new bid's cost as a function of a plurality of said at least one first bid having price components lower than the price component of said new bid.

27. The apparatus of claim 19, wherein said computer processor calculates said new bid's cost as a function of at least one of said at least one first bid having the lowest price components which would have been provided at least a portion of said resource if said new bid was not made.

28. The apparatus of claim 27, wherein said computer processor calculates said new bid's cost as a function of a plurality of said at least one first bid having price components lower than the price component of said new bid.

29. The apparatus of claim 19, wherein one of said at least one first bid bids is submitted by an operator of said apparatus.

30. The apparatus of claim 19, wherein said at least one first bid comprises valuation data comprising a plurality of price components associated with a plurality of quantity components.

31. The apparatus of claim 30, wherein said second means for providing is responsive to said plurality of price components and said quantity components.

32. The apparatus of claim 19, wherein said new bid comprises valuation data comprising a plurality of price components associated with a plurality of quantity components.

33. The apparatus of claim 32, wherein said second means for providing is responsive to said new bid's plurality of price components and said quantity components.

34. A method of allocating a divisible resource comprising the steps of:
   receiving a list of previously submitted bids from previous bidders, each bid comprising at least one quantity component and at least one associated price component, said previously submitted bids sorted by said price components;

receiving a total quantity of said divisible resource to allocate;

receiving a new bid comprising at least one quantity component and at least one associated price component;

first providing a portion of said resource to the bidder of each previously submitted bid having a price component higher than said new bid's price component, in an amount equal to each respective bid's quantity component;

first determining the first remaining amount of said resource not allocated during said first providing step;

second providing, in response to said first determining, a portion of said resource to the bidder of said new bid in an amount equal to the lower of said quantity component of said new bid or said first remaining amount of said resource;

second determining a second remaining amount of said resource not allocated during said first and second providing steps;

third providing a portion of said second remaining amount of said resource to the bidder of a previously submitted bid having the highest price component lower than said new bid's price component, repeating said third providing for the next highest previously submitted bid, until none of said second remaining amount remains to be provided;

third determining at least one previously submitted bid having a price component lower than the price component of said new bid that, if said new bid had not been made, would have been provided with a greater portion of said resource than was actually provided to that bidder and designating that bid an excluded allocation bid and designating said greater portion an excluded allocation quantity associated with said excluded allocation bid; and calculating in a processor the cost paid by said new bidder as a function of the price component associated with said excluded allocation bid.

35. The method of claim 34, wherein said third determining comprises determining each at least one previously submitted bid having a price component lower than the price component of said new bid that, if said new bid had not been made, would have been provided with a greater portion of said resource than was actually provided to that bidder, designating each such bid an excluded allocation bid and each such greater portion an excluded allocation quantity associated with the excluded allocation bid;

and wherein said calculating step comprises calculating, for each such excluded allocation bid, the respective product of the associated excluded allocation quantity and bid price and said cost paid by said bidder is a function of the sum of said respective products.

36. The method of claim 34, wherein said third providing comprises providing the maximum of said second remaining amount and the quantity component of said previously submitted bid.

* * * * *